(12) United States Patent
Sproule, III et al.

(10) Patent No.: US 11,787,155 B2
(45) Date of Patent: Oct. 17, 2023

(54) REINFORCED RIGID INSULATION

(71) Applicant: Charles G. Sproule, III, Malvern, PA (US)

(72) Inventors: Charles G. Sproule, III, Malvern, PA (US); Charles G. Sproule, IV, Durham, NC (US)

(73) Assignee: Charles G. Sproule, III, Malvern, PA (US)

( * ) Notice: Subject to any disclaimer, the term of this patent is extended or adjusted under 35 U.S.C. 154(b) by 62 days.

(21) Appl. No.: 17/478,303

(22) Filed: Sep. 17, 2021

(65) Prior Publication Data

US 2022/0001648 A1 Jan. 6, 2022

Related U.S. Application Data

(62) Division of application No. 15/493,638, filed on Apr. 21, 2017, now Pat. No. 11,123,956.

(Continued)

(51) Int. Cl.
*B32B 9/00* (2006.01)
*B32B 5/16* (2006.01)
(Continued)

(52) U.S. Cl.
CPC ............... *B32B 9/005* (2013.01); *B32B 1/00* (2013.01); *B32B 1/08* (2013.01); *B32B 3/26* (2013.01); *B32B 5/028* (2013.01); *B32B 5/16* (2013.01); *B32B 5/24* (2013.01); *B32B 5/30* (2013.01); *B32B 7/02* (2013.01); *B32B 7/04* (2013.01); *B32B 7/12* (2013.01); *B32B 37/12* (2013.01); *B32B 38/1866* (2013.01); *B32B 2250/02* (2013.01); *B32B 2260/021* (2013.01); *B32B 2260/025* (2013.01); *B32B 2260/046* (2013.01);
(Continued)

(58) Field of Classification Search
CPC ............ B32B 37/12; B32B 2037/1253; B32B 2305/08; F16L 59/00–026; F16L 59/029; F17C 1/12; F17C 3/02; F17C 3/04
See application file for complete search history.

(56) References Cited

U.S. PATENT DOCUMENTS 2,520,978 A 9/1950 Super
3,886,076 A 5/1975 Venable
(Continued)

FOREIGN PATENT DOCUMENTS

CN 202194262 U * 4/2012
CN 202194262 U 4/2012
(Continued)

OTHER PUBLICATIONS

Kogel, et al. (2006). Industrial Minerals and Rocks—Commodities, Markets, and Uses (7th Edition)—83.2.1 Calcium Silicate Insulation. Society for Mining, Metallurgy, and Exploration (SME) (Year: 2006).*

(Continued)

*Primary Examiner* — Carson Gross
(74) *Attorney, Agent, or Firm* — Volpe Koenig

(57) ABSTRACT

A reinforced insulation assembly is disclosed. The assembly includes insulation, a reinforcement layer, and an adhesive for attaching the reinforcement layer to a surface of the insulation. The reinforced layer is fully immersed within the adhesive and penetrates the surface of the insulation.

20 Claims, 6 Drawing Sheets

Related U.S. Application Data

(60) Provisional application No. 62/326,506, filed on Apr. 22, 2016.

(51) Int. Cl.

| | | |
|---|---|---|
| *B32B 1/00* | (2006.01) | |
| *B32B 1/08* | (2006.01) | |
| *B32B 5/30* | (2006.01) | |
| *B32B 5/24* | (2006.01) | |
| *B32B 7/04* | (2019.01) | |
| *B32B 3/26* | (2006.01) | |
| *B32B 7/02* | (2019.01) | |
| *B32B 5/02* | (2006.01) | |
| *B32B 7/12* | (2006.01) | |
| *B32B 37/12* | (2006.01) | |
| *B32B 38/18* | (2006.01) | |

(52) U.S. Cl.
CPC . *B32B 2262/0253* (2013.01); *B32B 2262/101* (2013.01); *B32B 2264/102* (2013.01); *B32B 2307/304* (2013.01); *B32B 2307/50* (2013.01); *B32B 2307/546* (2013.01); *B32B 2307/718* (2013.01); *B32B 2307/72* (2013.01); *B32B 2307/732* (2013.01); *B32B 2307/752* (2013.01); *B32B 2597/00* (2013.01)

(56) References Cited

U.S. PATENT DOCUMENTS

| | | | | |
|---|---|---|---|---|
| 4,280,942 | A | 7/1981 | Green | |
| 6,319,312 | B1 | 11/2001 | Luongo | |
| 2008/0115442 | A1 | 5/2008 | Cheng | |
| 2008/0206543 | A1* | 8/2008 | Whitaker | C04B 28/26 |
| | | | | 156/77 |
| 2009/0130389 | A1 | 5/2009 | Whitaker et al. | |
| 2013/0189493 | A1 | 7/2013 | Decker | |
| 2014/0138007 | A1 | 5/2014 | Dubey et al. | |
| 2015/0368916 | A1 | 12/2015 | Ciuperca | |

FOREIGN PATENT DOCUMENTS

| | | |
|---|---|---|
| CN | 102829284 A | 12/2012 |
| WO | 02058902 A2 | 8/2002 |

OTHER PUBLICATIONS da Silva et al., "Handbook of Adhesion Technology", vol. 2, Springer-Verlag Berlin Heidelberg; pp. 1-40; (2011).
Johns Manville Industrial Group, "Sproule WR-1200® Perlite Pipe & Block Insulation, Specification Sheet", Brunswick, GA (Jun. 2015).
"Your Insulation Solutions Provider"—Johns Manville (2015).
H.B. Fuller Company, "Waterbase Product", Technical Data Sheet, EG-2314 EN (Apr. 17, 2003).
H.B. Fuller Company, "Waterbase Adhesive", Technical Datasheet, PA1150 EN (May 19, 2003).
H.B. Fuller Company, "Polymer Adhesive", Technical Datasheet, PD2126 (Apr. 30, 2009).
H.B. Fuller Company, "Swift®tak 48100 Aqueous Adhesive", Technical Data Sheet (Feb. 2007).
H.B. Fuller Company, "Waterbase Adhesive", Technical Data Sheet, TT3005 (Sep. 15, 2016).
H.B. Fuller Company, "Waterbase Product", Technical Data Sheet, WB1798 (Oct. 25, 2007).
H.B. Fuller Company, "Waterbase Product", Technical Data Sheet, XR-5339 Y RC (Apr. 18, 2003).
Childers, "Non-Flammable Quick Setting Adhesive for Calcium Silicate and Other Insulations" Fibrous Adhesive CP-97, Specialty Construction Brands, Inc. (Aug. 28, 2013).
Standard Specification for Molded Expanded Perlite Block and Pipe Thermal Insulation (Undated).
Standard Test Methods for Breaking Load and Flexural Properties of Block-Type Thermal Insulation (Undated).
General Insulation Company, "Clean, Efficient & Resilient Energy—A Study in Industrial Insulation" (2017).
Antarox BL-240, Product Data Sheet (Jan. 2009).
Howred Corp., "GOODTEMP—Thermal Industrial Insulation Manufactured By: Howred Corp." Houston, TX (Undated).
IMC Insulation Materials Corporation—High Temp Insulation (2014).
SMC Industries, Inc., Calsilite Manufacturing Corporation, "WR-1200 Specification Sheet" (Undated).
International Search Report and Written Opinion for PCT Application No. PCT/US17/28779, dated Aug. 7, 2017.

* cited by examiner

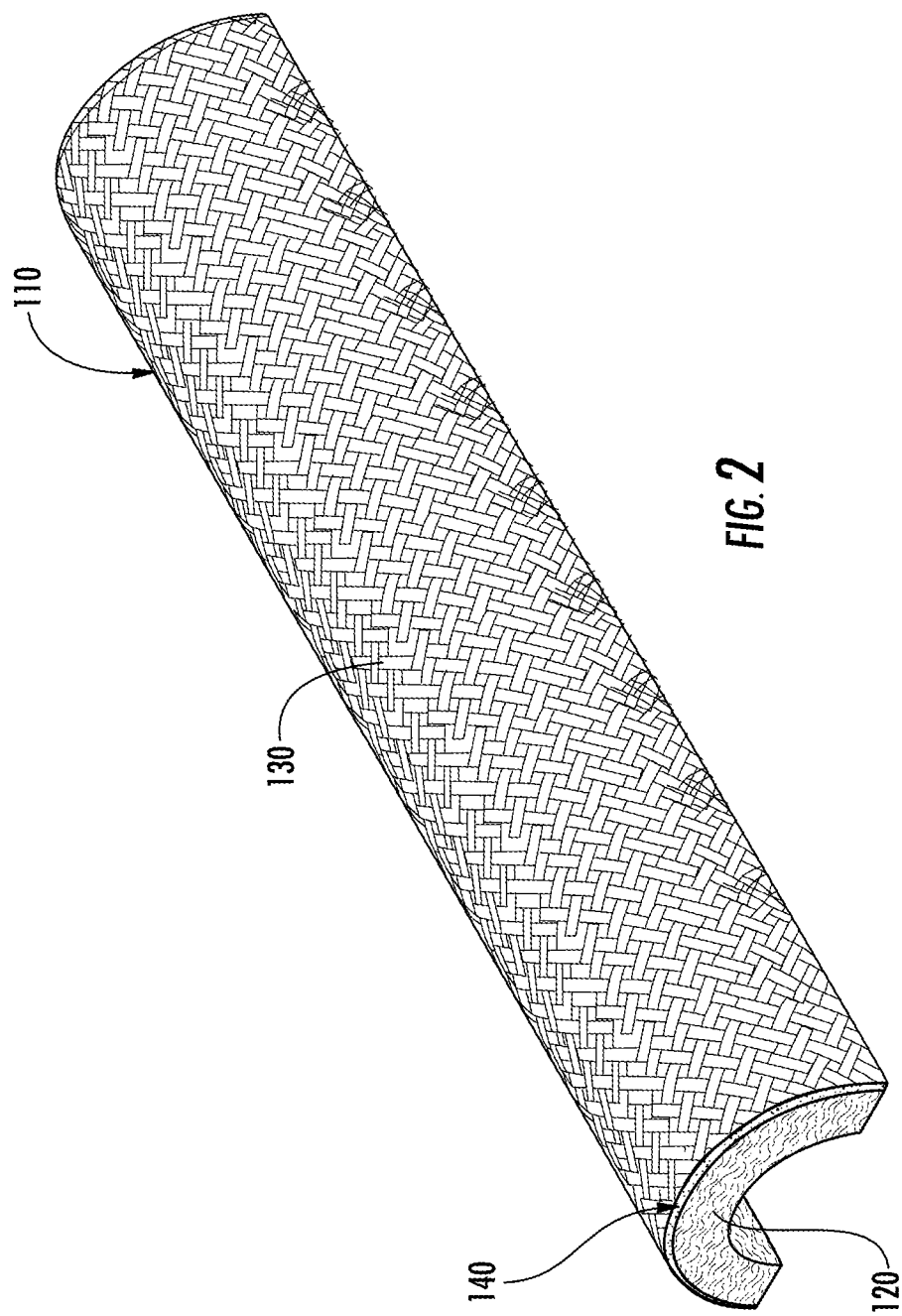

REINFORCED RIGID INSULATION

INCORPORATION BY REFERENCE

This application claims the benefit of U.S. Provisional Patent Application 62/326,506 filed on Apr. 22, 2016, and U.S. Non-Provisional patent application Ser. No. 15/493,638, filed on Apr. 21, 2017, which are both incorporated herein by reference as if fully set forth.

FIELD OF INVENTION

The present invention relates to industrial insulation, and more particularly relates to high-temperature industrial insulation.

BACKGROUND

Rigid insulation for high-temperature applications is well known. Insulation is required for energy conservation, personnel protection, condensation control, freeze protection, noise reduction, and fire protection. Some rigid insulation is very brittle, which can cause breaking, abrasions, crushing, and/or pulverizing during handling of the rigid insulations. One known type of rigid insulation includes crystalline bonds between granular particles to provide the rigid shape of the insulation. These crystalline bonds are extremely brittle and crack very easily. Other types of known rigid insulation include air filled solids with air bubbles. While air provides excellent insulation properties, these air bubbles are susceptible abrasions, pulverization, and crushing.

Perlite silicate is one type of known rigid insulation. Perlite silicate has high compression strength and insulates a wide temperate range (i.e. 125° F. to 1200° F.). Perlite silicate is non-combustible and serves as a corrosion inhibitor. Perlite silicate is relatively delicate due to its granular structure and crystalline bonds which includes air bubbles, making perlite silicate prone to cracking, crumbling, and abrading. During handling, perlite silicate can shift or otherwise rub against adjacent surfaces causing undesirable dust and particulate. Perlite silicate is also prone to complete fractures and cracking during pre-installation transportation and handling.

Due to the delicate properties of rigid insulation, it would be desirable to provide an improved insulation assembly that resists breaking, crushing, abrading, pulverizing, and excessive friability. One known method for improving the durability of insulation is to add loose fibers to the insulation, such as disclosed in U.S. Pat. No. 3,886,076. Adding fibers to insulation has been a standard method for reinforcement of granular, rigid high temperature industrial insulation. During manufacturing, it is difficult to get the loose fibers to homogeneously mix within the insulation prior to molding or forming. In addition, utilizing loose fibers in the manufacturing process causes additional wear and tear on the standard manufacturing equipment, in addition to increased need for maintenance and cleaning of equipment. Adding loose fibers to insulation requires advanced and costly manufacturing technologies and processes to ensure adequate distribution of the fibers. Adding loose fibers to insulation is also relatively expensive due to the cost of the maintaining the manufacturing equipment. In order to have any effect on flexural strength, it is necessary to introduce a large volume of the fibers. However, adding a large volume of fibers to known insulation elements tends to disrupt the insulation properties of the insulation element. Finally, extensive testing of various fibers, including the composition, amount, and mode of dispersal, has proven that that the addition of loose fibers to insulation is ineffective at providing any significant improvement in flexural strength or reduction of the cracking, breaking, or friability issues that are known to limit the use of certain rigid high temperature industrial insulations. Further testing showed that the inability of the loose fibers to increase flexural strength was largely due to the fact that the bond between the loose fibers and the crystalline binder in the rigid insulation was too brittle and weak to increase flexural strength or reduce cracks, breakage, and friability.

It would be desirable to provide reinforcement for rigid insulation that is flexible and durable, that does not interfere with the structure and performance of the insulation itself, and also reduces dust.

SUMMARY

An improved reinforced insulation assembly that reduces friability, improves durability, and reduces cracking, breaking and formation of dust is provided.

In one embodiment, the reinforced insulation assembly includes insulation, a reinforcement layer, and adhesive for attaching the reinforcement layer to a surface of the insulation.

In one embodiment, the reinforced insulation assembly includes a reinforcing agent, a rigid insulation, and a binder that interacts with both the insulation and the reinforcing agent to transfer properties of the reinforcing agent to the rigid insulation.

In another embodiment, the reinforced insulation assembly includes insulation formed from pre-formed or molded rigid perlite silicate, and the insulation includes a porous surface. In one embodiment, a reinforcement layer is formed from an open weave fiber. Adhesive attaches the reinforcement layer to the insulation. The reinforcement layer is embedded within or coated with the adhesive, and the adhesive penetrates the porous surface of the insulation.

In one embodiment, the adhesive is selected from the group consisting of: polyvinyl alcohol adhesive, acrylic adhesive, vinyl acrylic adhesive, clay alcohol adhesive, starch/dextrin adhesive, vinyl acetate ethylene adhesive, and starch clay polyvinyl alcohol adhesive.

In another embodiment, a method of producing a reinforced insulation assembly is provided. The method includes (a) providing a pre-formed or molded rigid insulation, (b) applying adhesive to a surface of the pre-formed rigid insulation, and (c) pressing a reinforcement layer against the surface of the pre-formed rigid insulation including the adhesive to fix the reinforcement layer to the pre-formed rigid insulation, such that the reinforcement layer is fully immersed or coated with the adhesive.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 2 is a perspective view of a reinforced rigid insulation according to a second embodiment.

DETAILED DESCRIPTION OF THE PREFERRED EMBODIMENTS

Figure 1A:
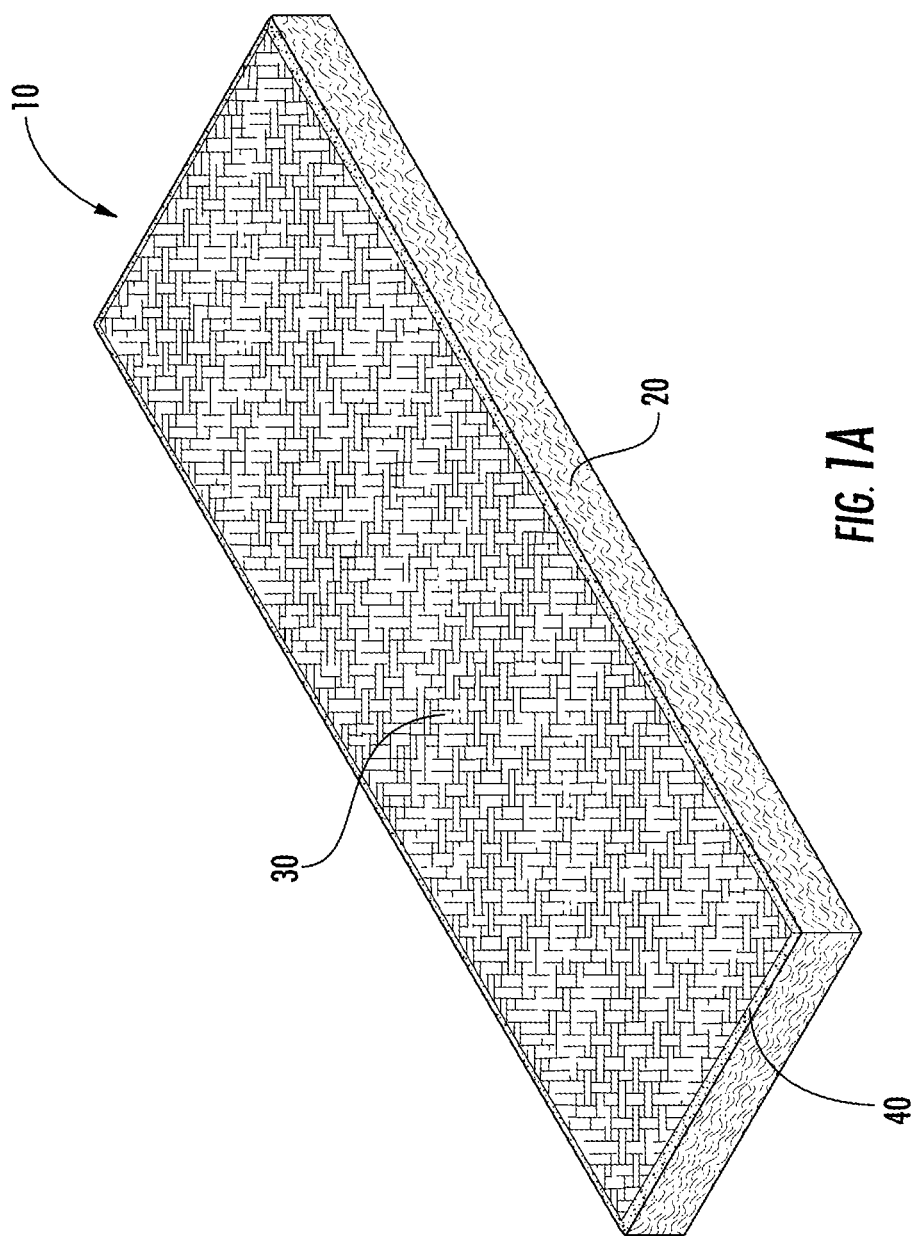
FIG. 1A is perspective view of a reinforced rigid insulation according to a first embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1B:
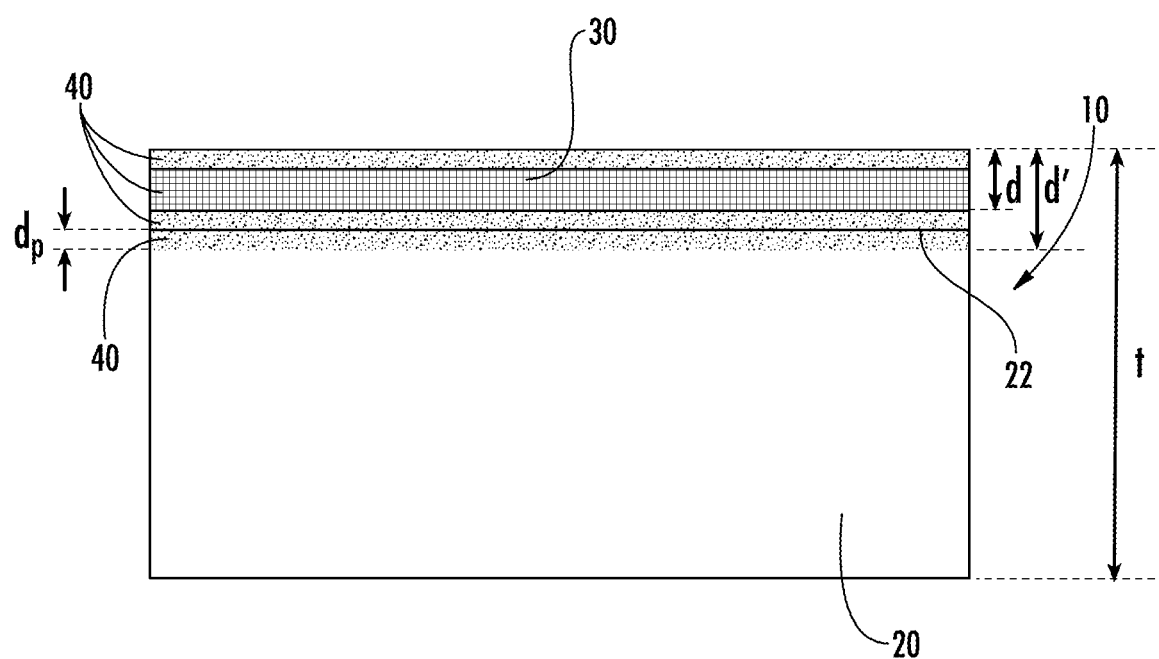
FIG. 1B is a side cross sectional view of the reinforced rigid insulation of FIG. 1A.
Figure 1C:
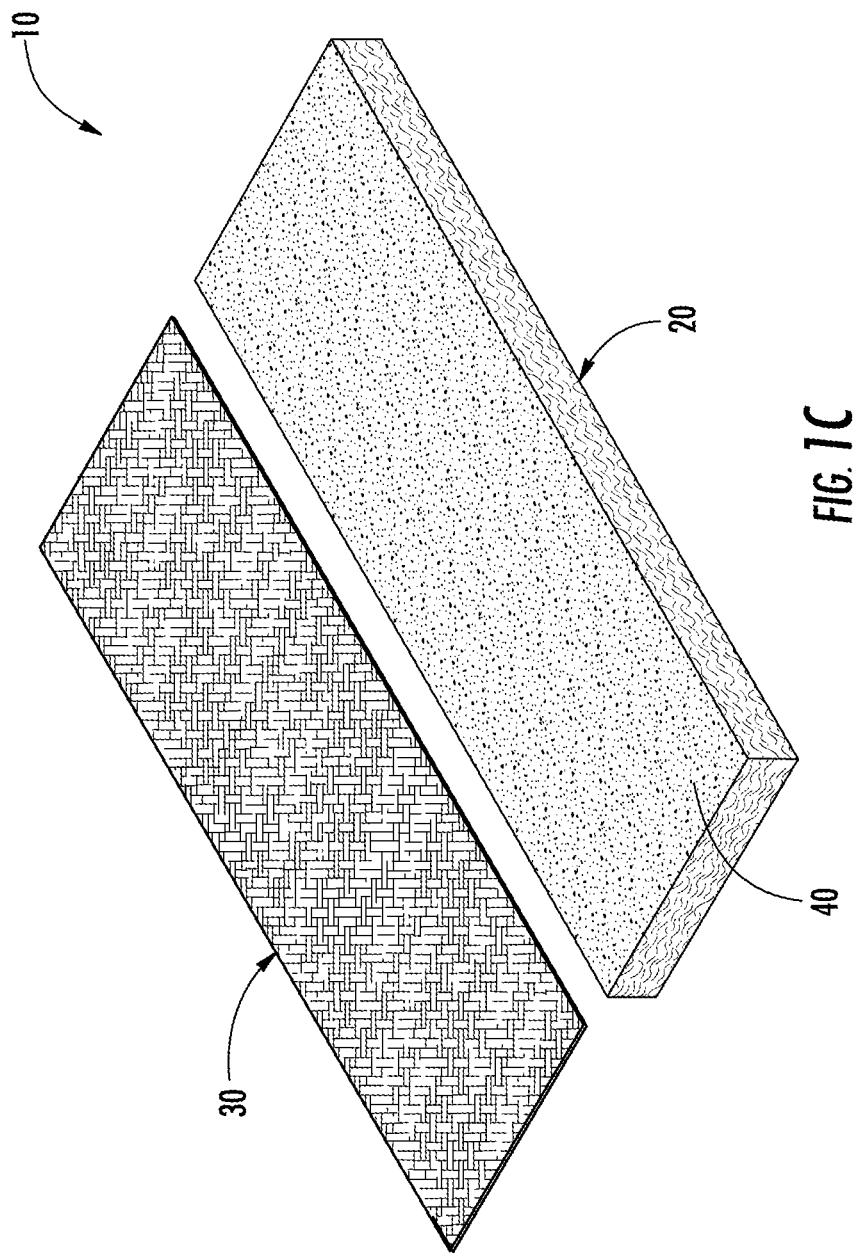
FIG. 1C is a perspective view of the reinforced rigid insulation of FIGS. 1A and 1B in a pre-assembled state.

Referring to FIGS. 1A-1C, a reinforced insulation assembly 10 is disclosed. The reinforced insulation assembly 10 includes three primary components: insulation 20, a reinforcement layer 30, and adhesive 40. In an embodiment, the adhesive 40 is applied to an outer surface of the insulation 20, and the reinforcement layer 30 is bonded to the insulation 20 via the adhesive 40. In another embodiment, the adhesive 40 is applied to an inner surface of the insulation 20 with respect to an underlying component that is to be insulated. Alternatively, the adhesive 40 can be applied to the reinforcement layer 30 and bonded to the insulation 20. These components are described in more detail below.

In one embodiment, the insulation 20 is an industrial insulation for high-temperature applications. As used herein, high-temperature applications is understood to mean an application experiencing temperatures between 601° F. and 1500° F. In one embodiment, the insulation 20 is granular. Granular is understood to mean a material composed of small nodules with voids, hollow spaces, or gaps. In one embodiment, the insulation 20 is formed from perlite silicate or calcium silicate. More preferably, the insulation 20 is formed from perlite silicate. In one embodiment, perlite silicate has as operating temperature limit of at least 1200° F. The perlite silicate preferably has a thickness of 1 inch to 4 inches. At 100° F., perlite silicate exhibits the following thermal performance characteristics: 0.47 Btu*in/(hr*ft$^2$*° F.) and 0.068 W/m° K. At 200° F., perlite silicate exhibits the following thermal performance characteristics: 0.51 Btu*in/(hr*ft$^2$*° F.) and 0.074 W/m° K. At 400° F., perlite silicate exhibits the following thermal performance characteristics: 0.62 Btu*in/(hr*ft$^2$*° F.) and 0.089 W/m° K. At 600° F., perlite silicate exhibits the following thermal performance characteristics: 0.74 Btu*in/(hr*ft$^2$*° F.) and 0.107 W/m° K.

In one embodiment, the insulation 20 is a pre-formed or molded rigid insulation layer that is configured to surround a pipe, elbow, tank, valve, or any other component requiring high-temperature insulation. One of ordinary skill in the art would recognize from the present disclosure that the insulation 20 can be formed to have a variety of shapes or dimensions, such as straight pipes, pipe junctures, bent pipes, large gauge pipes, small gauge pipes, etc.

In one embodiment, the reinforcement layer 30 and the adhesive 40 is applied to a top or bottom surface of the insulation 20. In another embodiment, the reinforcement layer 30 and the adhesive 40 can be applied to side edges of insulation 20.

The reinforcement layer 30 is preferably formed from a fabric, mesh, film, foil, scrim, or other material. In one embodiment, the reinforcement layer is a fine mesh scrim made of fiberglass thread. In one embodiment, the fiberglass thread has a diameter of 0.1524 mm. The term mesh can include any type of layer of material including a plurality of openings or channels. In a preferred embodiment, the reinforcement layer 30 is formed from fiberglass mesh. In other embodiments, the reinforcement layer 30 is preferably formed from a polymer mesh, such as polyethylene mesh or polypropylene mesh. In a preferred embodiment, the reinforcement layer 30 defines a mesh having a grid profile defined by a plurality of openings, and each opening preferably defines an interstitial space. The openings preferably have a length of 1 mm to 10 mm and a width of 1 mm to 10 mm. In one embodiment, each one of the plurality of openings has a 3 mm length and a 3 mm width. The combination of the size of the openings and the viscosity of the adhesive 40 ensures that adhesive 40 seeps through the interstitial space of the openings of the reinforcement layer 30 and into contact with the insulation 20. Significantly smaller grid profiles can prohibit adequate seepage of the adhesive 40 through the reinforcement layer 30 to the insulation 20, while significantly larger grid profiles can reduce strength characteristics of the reinforcement layer 30. The reinforcement layer 30 preferably covers between 20% to 100% of at least one surface 22 of the insulation 20. The reinforcement layer 30 can be applied a single sheet, as a plurality of strips, or any other configuration. The reinforcement layer 30 more preferably covers 90% of the at least one surface 22 of the insulation 20. In one embodiment, the reinforcement layer 30 covers 100% of the at least one surface 22 of the insulation 20.

Figure 4:
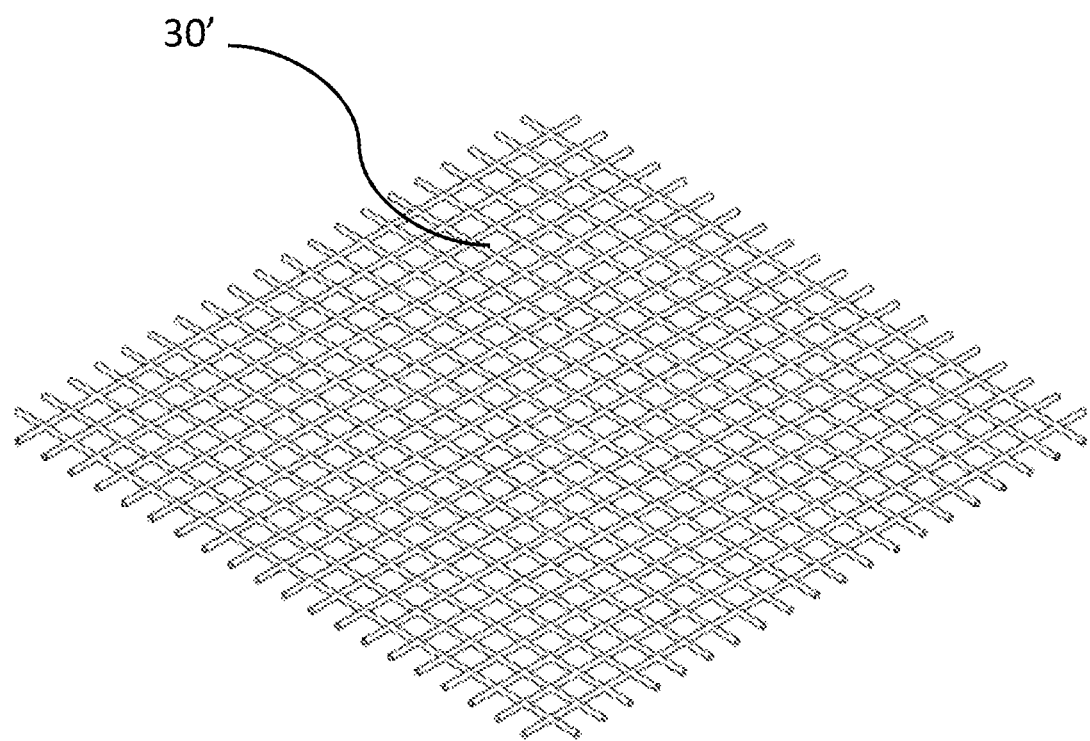
FIG. 4 is a perspective view of one embodiment of a reinforcement layer.

The reinforcement layer 30 has a relatively high tensile strength compared to the insulation 20. The reinforcement layer 30 strengthens the insulation 20 when adhered to the insulation to help minimize crack formation and propagation. In one embodiment, the reinforcement layer 30 is a bi-directional mesh of fibers. The dual direction of the fibers reinforces the bonds of the insulation. Bidirectional fibers in the reinforcement layer 30 further help prevent crack formation and propagation in the insulation 20. In one embodiment, multidirectional fibers are provided, for example a triangular weave, to reinforce the reinforcement layer 30. FIG. 4 shows one embodiment of the reinforcement layer 30'. As shown in FIG. 4, the reinforcement layer 30' includes a mesh having a grid profile. One of ordinary skill in the art would recognize from the present disclosure that the different types of reinforcement layers 30 and 30' can be interchanged. In one embodiment, the reinforcement layer 30 includes fibers having a relatively small diameter (i.e. 0.10 mm to 0.20 mm), which improves the bond between the reinforcement layer 30 and the insulation 20. The small diameter of the fiber allows the adhesive 40 to flow around the fibers and bond to the insulation 20. The density of the reinforcement layer 30 is selected to ensure that the reinforcement layer 30 is coarse enough to allow adhesive to flow through the reinforcement layer 30 to the insulation 20, but also fine enough to provide sufficient strength for preventing cracks. The reinforcement layer 30 is also thin enough so as to not significantly alter the outer diameter of the assembly 10. The reinforcement layer 30 has a relatively high temperature tolerance that allows the reinforcement layer 30 to withstand relatively high operating temperatures of an underlying insulated component.

In one embodiment, once the reinforced insulation assembly 10 is assembled, the reinforcement layer 30 is fully encased within the adhesive 20, as shown most clearly in FIG. 1B. The adhesive 40 fully surrounds a top surface and a bottom surface of the reinforcement layer 30, as well as fills in any interstitial spaces contained within the reinforcing layer or reinforcing agent. In one embodiment, a depth (d) of the reinforcement layer 30 in the fully formed reinforced insulation assembly 10 (including a top layer of the adhesive 40) is between 1.5 mm to 10 mm. In another embodiment, the adhesive 40 only coats the reinforcement layer 30, i.e. the adhesive 40 contacts only one side of the reinforcement layer 30.

The reinforcement layer 30 preferably has a yarn tex (c-glass) warp value of 30×2 and a weft value of 45. A weight of the reinforcement layer 30 is approximately 45 g/m². A density count of the reinforcement layer 30 per 25 mm has a warp value of 10 and a weft value of 10. A tensile strength of the reinforcement layer 30 is approximately 450 N/(5 cm*20 cm) for a warp, and 450 N/(5 cm*20 cm) for a weft. The reinforcement layer 30 is preferably a leno weave structure. The reinforcement layer 30 preferably has a resin content of approximately 13-15%. The resin in the reinforcement layer 30 is preferably an acrylic resin. In one embodiment, the reinforcement layer 30 has an alkali-resistant % of approximately 65% in a warp direction, and approximately 65% in a weft direction. This percentage is calculated as a percentage of tensile strength after 28 days of immersion in a solution of 5% NaOH.

The adhesive 40 is selected to provide a strong bond to both the insulation 20 and the reinforcement layer 30. In one embodiment, the adhesive 40 is a low viscosity polyvinyl acetate adhesive. In a preferred embodiment, the adhesive 40 is a vinyl acetate ethylene (VAE) based adhesive. The adhesive 40 has a viscosity that allows the adhesive 40 to seep through the grid defined by the reinforcement layer 30 and into a surface 22 of the insulation 20. The insulation 20 can include a porous surface 22, such as provided by a granular insulation, to promote seepage of the adhesive 40 into the insulation 20. This leads to effective wetting of the adhesive 40 with respect to the insulation 20.

Penetration of the adhesive 40 into the insulation 20 improves the flexural strength of the reinforced insulation assembly 10 and reduces vulnerability to cracking, faults, and breakage. The adhesive 40 preferably seeps through the interstitial spaces defined by the reinforcement layer 30 and penetrates the surface 22 of the insulation 20 to a penetrative depth ($d_p$) of 0.25 mm to 3.0 mm. The penetrative depth of the adhesive 40 is controlled to ensure the adhesive 40 does not penetrate too deep into insulation 20 and adversely affect the structure of the insulation 20, thus reducing its insulating capability. A total depth (d') of the combination of the reinforcement layer 30 and the adhesive 40, including the penetrative depth ($d_p$) is also shown in FIG. 1B. In one embodiment, this total depth (d') is between 1.0 mm to 13.0 mm.

In one embodiment, the insulation 20 receives a surface treatment prior to applying the adhesive 40 and prior to laying the reinforcement layer 30 on the insulation 20. In one embodiment, a surfactant can be applied to a surface 22 of the insulation 20 to improve penetration of the adhesive 40 into the insulation 20. In one embodiment, the surfactant is Anatrox BL-240 or a general non-ionic surfactant as known in the art. In another embodiment, other surface modifications can be applied to the insulation 20, such as scoring, texturing, bores, etc., to improve penetration of the adhesive 40 into the insulation 20. The properties of the adhesive 40 are selected to ensure that the adhesive 40 fully saturates and encapsulates the reinforcement layer 30. In addition to improving the strength of the insulation assembly 10, the adhesive 40 provides a protective buffer of the reinforcement layer 30 from the insulation 20. In one embodiment, the insulation 20 can include a sodium silicate based binder, which is corrosive to the reinforcement layer 30. The adhesive 40 provides a barrier to prevent corrosion of the reinforcement layer 30 via contact with the insulation 20. In this instance, the adhesive 40 acts as a sealant to protect the reinforcement layer 30.

The adhesive 40 is selected such that the adhesive 40 is able to penetrate and bond to the surface of the insulation 20. The adhesive 40 must be able to penetrate the porous surface of the granular insulation 20, thus forming a mechanical adhesion with the insulation 20 that is stronger than the cohesive forces within the insulation 20. This feature ensures that if/when the joint fails, the failure occurs within the insulation 20 (i.e. the adherend). Penetration of the adhesive 40 into the granular insulation 20 is dependent on the composition of the adhesive 40 in addition to its the viscosity.

While the adhesive 40 must have sufficient strength to bond the insulation 20 and the reinforcement layer 30, the adhesive 40 must also be flexible enough within the service temperature (i.e. ambient temperature) to withstand forces such as impact, vibration, and other stresses. The adhesive 40 must also be able to bond dissimilar materials with different coefficients of thermal expansion, i.e. the insulation 20 and the reinforcement layer 30. To do this, the adhesive 40 must have a low glass transition temperature, so that the service temperature is above the glass transition temperature. When an adhesive is above the glass transition temperature, polymers within the adhesive alter their state from a glass-like rigid solid to a more flexible, rubbery compound. An adhesive that works below its glass transition temperature, i.e. CP-97 or a rigid epoxy, may provide stronger bonds but is very brittle, and may fail when mechanically stressed. Adhesives with polymers with relatively higher glass transition temperatures can achieve a lower overall glass transition temperature through the addition of plasticizers. The adhesive 40 is selected to ensure that the adhesive 40 is able to coat and bond to the reinforcement layer 30. Fibers within the insulation 20 (whether singular, dispersed fibers or embedded in a fibrous mesh) typically fail due to the lack of strength in a bond that does not include the adhesive 40.

In one embodiment, the adhesive 40 is selected from the group consisting of: polyvinyl alcohol, acrylic, vinyl acrylic, clay alcohol, starch/dextrin, vinyl acetate ethylene, and starch clay polyvinyl alcohol based adhesives. In one embodiment, the adhesive 40 is a water-based glue. In another embodiment, the adhesive 40 is a solvent-based glue. In one embodiment, the melting temperature of the adhesive 40 is at least 250° F. Melting temperature is defined as the temperature at which constituents of the adhesive undergo irreversible physical degradation. A relatively high blocking temperature for the adhesive 40 is selected to ensure that the adhesive 40 does not ooze, seep, or melt, particularly during storage, transportation, or pre-installation. The blocking temperature of the adhesive 40 is preferably at least 115° F. The term blocking temperature is understood to refer to the temperature at which undesired adhesion between touching layers of material occurs under moderate pressure during storage or use (ASTM D 907-06). The viscosity of the adhesive 40 is preferably between 1,000 cP and 10,000 cP. This viscosity value ensures that the adhesive 40 penetrates the insulation 20 and reinforcement layer 30, while also having a sufficient viscosity to provide tackiness such that the adhesive 40 is easy to handle prior to assembly. The adhesive 40 must also provide sufficient tackiness to hold the reinforcement layer 30 in place prior to drying. The adhesive 40 preferably has a glass transition temperature that is greater than −4° F. and less than 86° F. The adhesive 40 preferably has a pH value between 4 and 7. This pH value is selected to prevent corrosion of the pipe surrounded by the reinforced insulation assembly 10, as well as any underlying insulation, and/or metal jacketing surrounding the insulation.

In one embodiment, the adhesive 40 is a polyvinyl alcohol based adhesive. In this embodiment, the adhesive 40 improves a flexural strength of the overall reinforced insulation assembly 10 by approximately 250% compared to non-treated insulation. Non-treated insulation, as used herein, is defined as insulation that does not include adhesive or a reinforcement layer. The flexural strength was tested according to ASTM test method C203. ASTM testing method C203 includes placing a test specimen on two support bars and loading the test specimen at a midway point between the two support bars until the test specimen ruptures. The ASTM C203 testing method provides a surrogate for determining the resistance of an insulation to cracks and breakage. The flexural strength provides sufficient strength and prevents cracks, faults, and breaking. In the polyvinyl alcohol based adhesive embodiment, the viscosity of the adhesive 40 is approximately 4,000 cP. The solid content of this adhesive 40 is approximately 12% to 14%. The density of this adhesive 40 is approximately 834. The glass transition temperature of this adhesive 40 is approximately 86° F.

In one embodiment, the adhesive 40 is an acrylic based adhesive. In this embodiment, the adhesive 40 improves a flexural strength of the overall reinforced insulation assembly 10 by approximately 415% compared to non-treated insulation. In this embodiment, the viscosity of the adhesive 40 is approximately 1,800 cP. The solid content of this adhesive 40 is approximately 54%. The density of this adhesive 40 is approximately 9. The glass transition temperature of this adhesive 40 is approximately 23° F.

In one embodiment, the adhesive 40 is a vinyl acrylic based adhesive. In this embodiment, the adhesive 40 improves a flexural strength of the overall reinforced insulation assembly 10 by approximately 700% compared to non-treated insulation. In this embodiment, the viscosity of the adhesive 40 is approximately 4,000 cP. The solid content of this adhesive 40 is approximately 53.5%. The density of this adhesive 40 is approximately 8.9. The glass transition temperature of this adhesive 40 is approximately 5° F.

In one embodiment, the adhesive 40 is a clay alcohol based adhesive. In this embodiment, the adhesive 40 improves a flexural strength of the overall reinforced insulation assembly 10 by approximately 158% compared to non-treated insulation. In this embodiment, the viscosity of the adhesive 40 is between 2,800 cP and 3,300 cP. The solid content of this adhesive 40 is between 19% and 23%. The density of this adhesive 40 is between 8.9 and 9.9. The glass transition temperature of this adhesive 40 is approximately 86° F.

In one embodiment, the adhesive 40 is a starch/dextrin based adhesive. In this embodiment, the adhesive 40 improves a flexural strength of the overall reinforced insulation assembly 10 by approximately 141% compared to non-treated insulation. In this embodiment, the viscosity of the adhesive 40 is approximately 2,000 cP. The solid content of this adhesive 40 is approximately 58%. The density of this adhesive 40 is approximately 9. The glass transition temperature of this adhesive 40 is approximately 93° F.

In one embodiment, the adhesive 40 is a vinyl acetate ethylene based adhesive. In this embodiment, the adhesive 40 improves a flexural strength of the overall reinforced insulation assembly 10 by approximately 284% compared to non-treated insulation. In this embodiment, the viscosity of the adhesive 40 is approximately 1,500 cP. The solid content of this adhesive 40 is approximately 54.3%. The density of this adhesive 40 is approximately 9. The glass transition temperature of this adhesive 40 is approximately 14° F.

In one embodiment, the adhesive 40 is a starch clay polyvinyl alcohol based adhesive. In this embodiment, the adhesive 40 improves a flexural strength of the overall reinforced insulation assembly 10 by approximately 192% compared to non-treated insulation. In this embodiment, the viscosity of the adhesive 40 is approximately 1,100 cP. The solid content of this adhesive 40 is approximately 53.5%. The density of this adhesive 40 is approximately 8.6 The glass transition temperature of this adhesive 40 is approximately 50° F.

Figure 3:
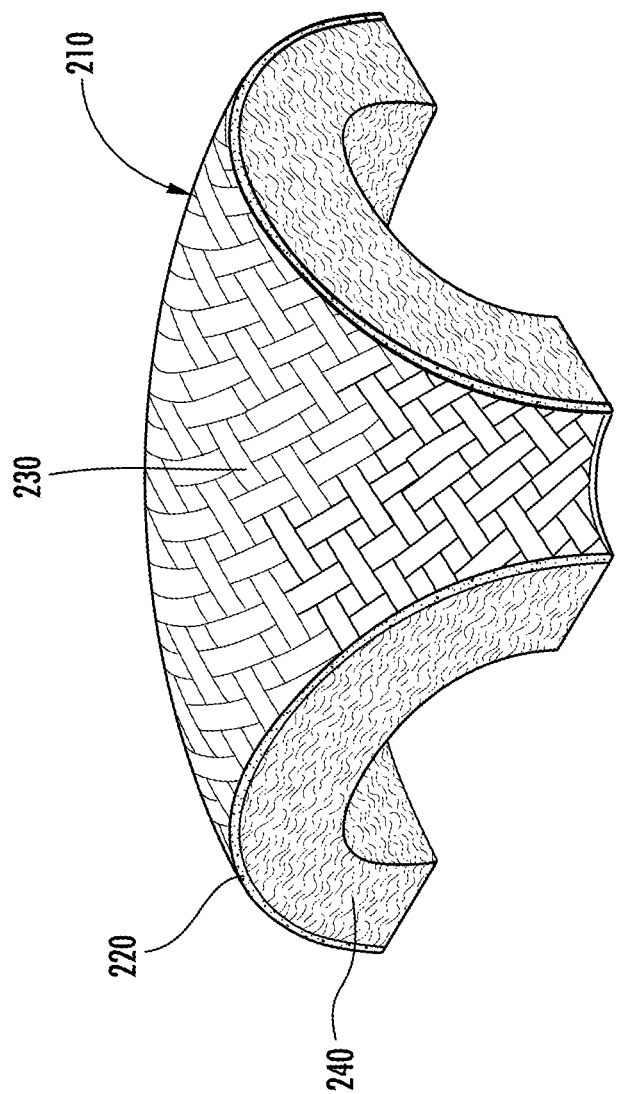
FIG. 3 is a perspective view of a reinforced rigid insulation according to a third embodiment

The embodiment of FIGS. 1A-1C includes rectangular insulation 20. The embodiments of FIGS. 2 and 3 are identical to the embodiment of FIGS. 1A-1C except the shape of the insulation 20 is modified. In FIG. 2, the insulation 120 has a curved profile. The remaining components, i.e. the assembly 110, reinforcement layer 130, and adhesive 140, are identical to the first embodiment. The curved insulation 120 is configured to accommodate a pipe or other cylindrical structure. In FIG. 3, the insulation 220 has a segmented torus profile, which is configured to accommodate a pipe juncture. The remaining components, i.e. the assembly 210, reinforcement layer 230, and adhesive 240, are identical to the first embodiment. One of ordinary skill in the art would recognize from the present disclosure that the assemblies and methods described herein can be modified such that the insulation can accommodate any variety of sizes or shapes.

The reinforcement system is applied to a radially outer surface 22 of the insulation 20. This ensures that the reinforcement layer 30 and adhesive 40 do not interfere with the heat transfer and insulation provided between the insulation 20 and the insulated pipe, which are arranged directly facing each other.

In another embodiment, a method of producing a reinforced insulation assembly 10 is provided. The method includes (a) providing a pre-formed or molded rigid insulation 20, (b) applying an adhesive 40 to a surface 22 of the pre-formed rigid insulation 20, and (c) pressing a reinforcement layer 30 against the surface 22 of the pre-formed rigid insulation 20 including the adhesive 40 such that the reinforcement layer 30 is fully covered or immersed within the adhesive 40. In one embodiment, the adhesive 40 is heated to a temperature of 120° F. to 180° F. prior to step (b). In one embodiment, the adhesive 40 is heated to 150° F. After step (c), the adhesive 40 is cured. In one embodiment, the adhesive 40 is cured via heating. During heated curing, the adhesive 40 is preferably heated to a temperature of 250° F. to 350° F. for three to ten minutes. In one embodiment, the heated curing is performed for five minutes.

In one embodiment, the adhesive 40 is only applied to the insulation 20 during step (b). In another embodiment, the adhesive 40 is applied to both the insulation 20 and the reinforcement layer 30 in step (b). In one embodiment, the reinforcement layer 30 is placed onto the insulation 20 first, and then adhesive 40 is applied to the combination of the reinforcement layer 30 and the insulation 20 such that the adhesive 40 seeps through the reinforcement layer 30 into contact with the insulation 20. In another embodiment, the adhesive 40 is applied to the insulation 20 separately, and applied to the reinforcement layer 30 separately, after which the adhesive-coated insulation 20 and adhesive-coated reinforcement layer 30 are pressed together for bonding. The reinforcement layer 30 is cut to accommodate a shape of the insulation 20 or a shape of a critical area that must be reinforced. Strips or other shapes of reinforcement layers 30 can be provided for irregularly shaped applications. Cutting of the reinforcement layer 30 can be performed prior to step (c) or after step (c).

In one embodiment, the insulation 20 is fully formed or molded and in a hardened state after step (a) and prior to steps (b) and (c). This ensures that the mesh of the reinforcement layer 30 in the fully formed insulation assembly 10 is arranged on an outer surface 22 of the insulation 20, and not within or inside the insulation 20. The reinforcement layer 30 and the adhesive 40 both contribute to prevent friability, abrasions, dust, and other issues with non-reinforced insulation. The combination of the reinforcement layer 30 and the adhesive 40 both improve the strength of the insulation assembly 10 as well as provide a protective outer layer for a surface 22 of the insulation 20, thus reducing friability. The adhesive 40 individually helps to prevent abrasions and formation of dust. In certain applications, adhesive 40 can be applied to an entire outer surface of the insulation 20, while the reinforcing layer 30 is only applied in certain critical portions of the insulation 20.

The present reinforced insulation assembly does not affect performance of the insulation with respect other critical ASTM specifications. For example, the reinforced insulation assembly does not detrimentally affect performance of the insulation with respect to ASTM C1045 for thermal conductivity, ASTM C795 for 28-day corrosion, as tested by ASTM C692 and ASTM C871, or accelerated corrosion by ASTM C1671 and ASTM C871.

Embodiments of the insulation, adhesive, and reinforcement layer used in the method are identical to the embodiments of the insulation, adhesive, and reinforcement layer described above.

What is claimed is:

1. A method of producing a reinforced insulation assembly, the method comprising:
   (a) providing a high-temperature rigid insulation that is pre-formed or molded;
   (b) applying an adhesive to a reinforcement layer defining a mesh such that the reinforcement layer is fully immersed in the adhesive; and
   (c) pressing the reinforcement layer against the outer surface of the high-temperature rigid insulation including the adhesive, such that the adhesive penetrates the outer surface of the high-temperature rigid insulation.

2. The method according to claim 1, wherein the high-temperature rigid insulation is hardened after step (a) and prior to step (c).

3. The method according to claim 1, wherein the adhesive seeps through the mesh defined by the reinforcement layer and penetrates the outer surface of the high-temperature rigid insulation to a depth of 0.25 mm to 3.0 mm.

4. The method according to claim 1, further comprising curing the adhesive after step (c) by heating.

5. The method according to claim 1, further comprising applying the adhesive separately to the outer surface of the high-temperature rigid insulation.

6. The method according to claim 1, wherein the high-temperature rigid insulation is formed from perlite silicate or calcium silicate.

7. The method according to claim 1, wherein the adhesive has a melting temperature greater than 250° F., a blocking temperature greater than 115° F., a glass transition temperature greater than −4° F. and less than 86° F., a viscosity between 1,000 cP and 10,000 cP, and a pH between 4 and 7.

8. The method according to claim 1, wherein the reinforcement layer is a fiberglass or polymer mesh.

9. The method according to claim 1, wherein step (b) includes applying the adhesive to a single outer surface of the high-temperature rigid insulation.

10. The method according to claim 1, wherein the adhesive is selected from the group consisting of: polyvinyl alcohol adhesive, acrylic adhesive, vinyl acrylic adhesive, clay alcohol adhesive, starch/dextrin adhesive, vinyl acetate ethylene adhesive, and starch clay polyvinyl alcohol adhesive.

11. The method according to claim 1, wherein a combination of the adhesive and the reinforcement layer have a depth of 1.0 mm to 13.0 mm.

12. The method according to claim 1, wherein the high-temperature rigid insulation is capable of an operating temperature between 601° F. — 1500° F.

13. The method according to claim 1, wherein the reinforced insulation assembly formed according to steps (a)-(c) includes at least four layers, including:
    a first layer formed of the high-temperature rigid insulation,
    a second layer directly above the first layer including a mixture of the adhesive and the high-temperature rigid insulation,
    a third layer directly above the second layer including the adhesive, and
    a fourth layer directly above the third layer including a combination of the adhesive and the reinforcement layer.

14. The method according to claim 13, wherein the reinforced insulation assembly includes a fifth layer directly above the fourth layer including the adhesive.

15. The method according to claim 1, wherein the adhesive is heated to a temperature of 120° F. to 180° F. prior to step (b).

16. The method according to claim 15, wherein the adhesive is cured via heating after step (c).

17. The method according to claim 16, wherein the adhesive is cured via heating to a temperature of 250° F. to 350° F.

18. The method according to claim 1, further comprising wrapping the reinforced insulation assembly around a pipe, a tank, or a valve,
    wherein the adhesive and the reinforcement layer are positioned outwardly relative to the pipe, the tank, or the valve.

19. A method of producing a reinforced insulation assembly, the method comprising:
    (a) providing a high-temperature rigid insulation that is pre-formed or molded;
    (b) applying an adhesive to a reinforcement layer defining a mesh such that the reinforcement layer is fully immersed in the adhesive, the adhesive being selected from the group consisting of: polyvinyl alcohol adhesive, acrylic adhesive, vinyl acrylic adhesive, clay alcohol adhesive, starch/dextrin adhesive, vinyl acetate ethylene adhesive, and starch clay polyvinyl alcohol adhesive; and
    (c) pressing the reinforcement layer against the outer surface of the high-temperature rigid insulation including the adhesive.

20. The method according to claim 19, wherein the adhesive is heated to a temperature of 120° F. to 180° F. prior to step (b).

* * * * *